Sept. 8, 1970     G. D. BERTOGLIO     3,527,633
MACHINE FOR THE AUTOMATIC CONTROLLED MANUFACTURE AND
OUTPUT OF PLASTIC BAGS
Filed Feb. 21, 1966     5 Sheets-Sheet 1

INVENTOR

Guido P. Bertoglio

BY Sparrow and Sparrow

ATTORNEYS

Sept. 8, 1970  G. D. BERTOGLIO  3,527,633
MACHINE FOR THE AUTOMATIC CONTROLLED MANUFACTURE AND
OUTPUT OF PLASTIC BAGS
Filed Feb. 21, 1966  5 Sheets-Sheet 2
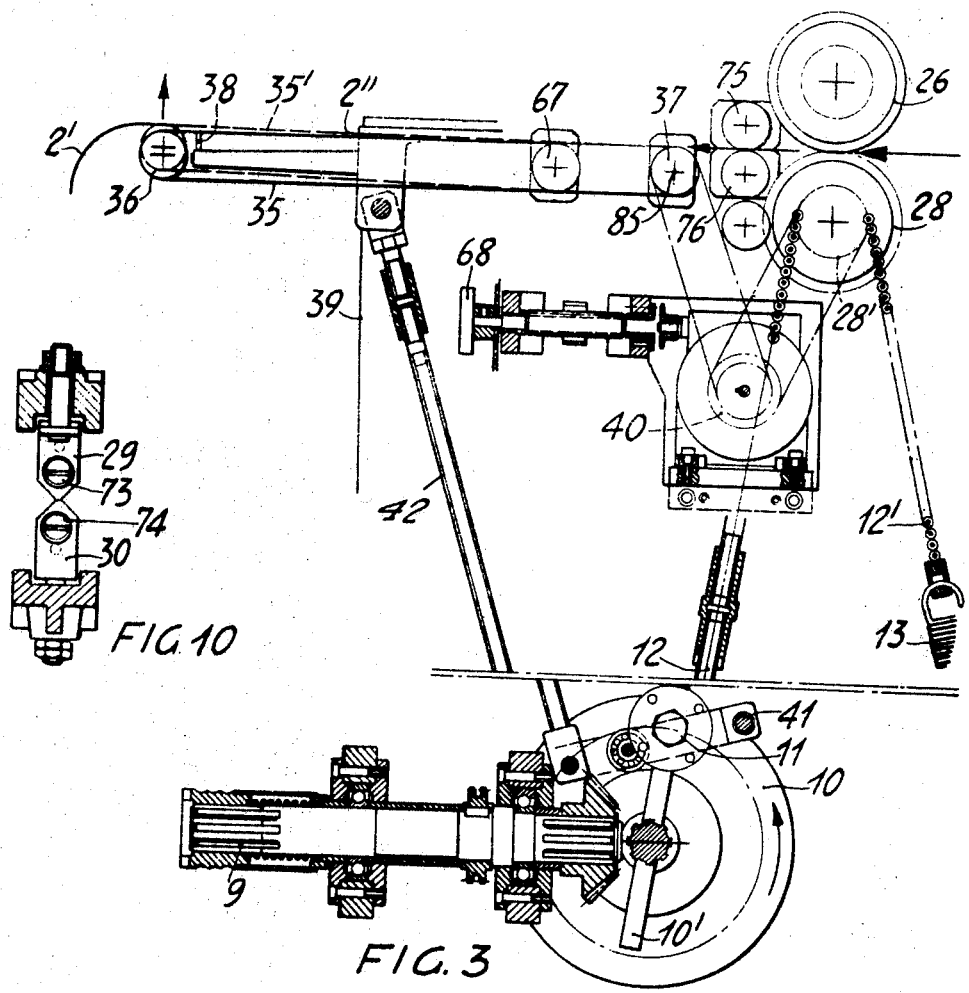
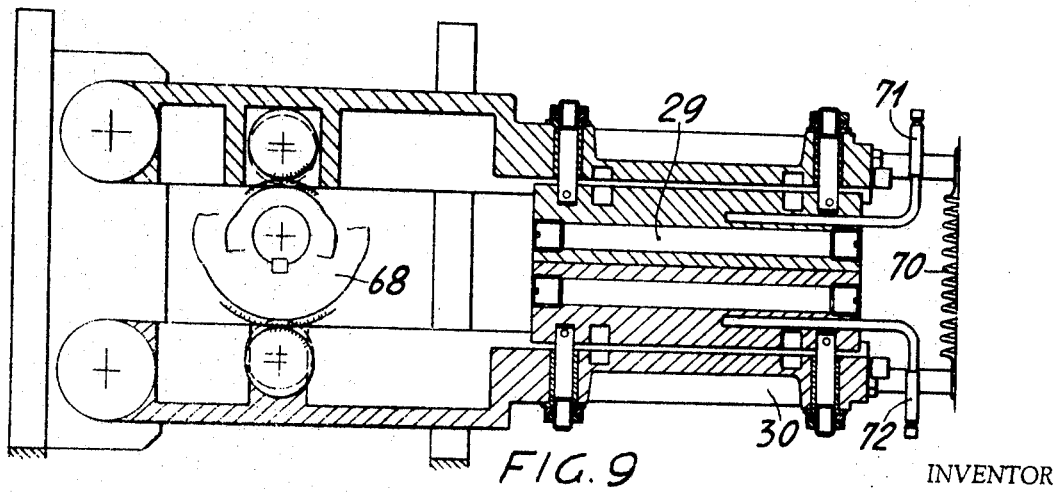
INVENTOR
Guido D. Bertoglio
BY Sparrow and Sparrow
ATTORNEYS

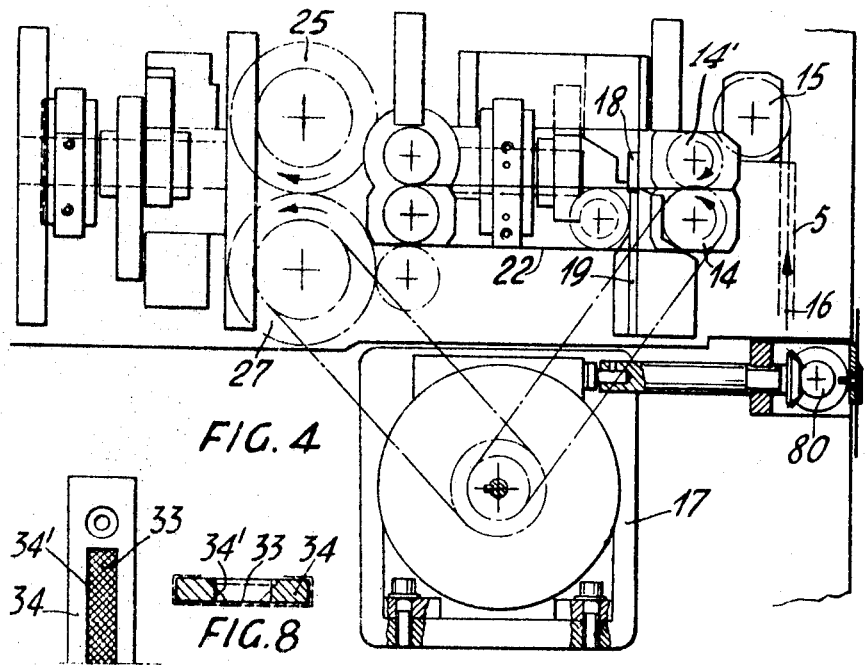
FIG. 4
FIG. 7
FIG. 8
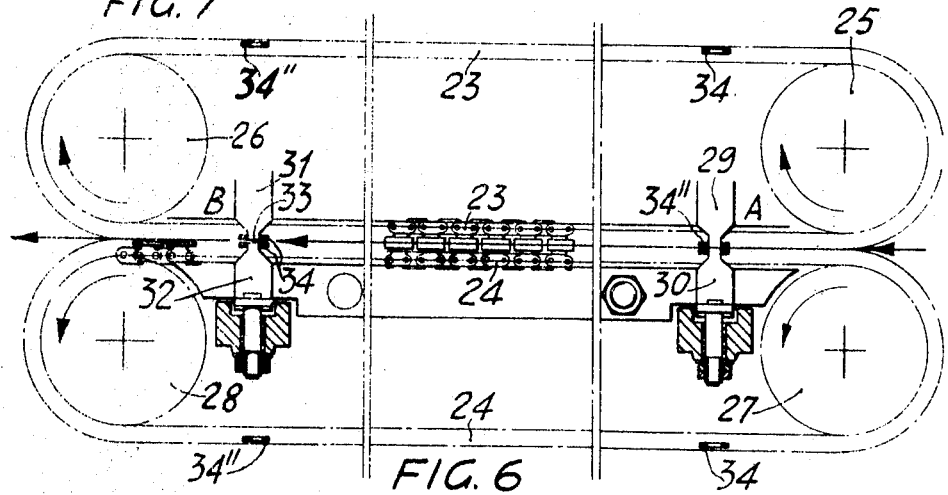
FIG. 6
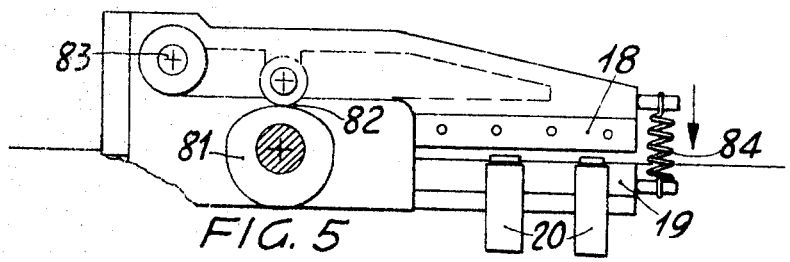
FIG. 5
INVENTOR
Guido D. Bertoglio
BY Sparrow and Sparrow
ATTORNEYS Sept. 8, 1970     G. D. BERTOGLIO     3,527,633
MACHINE FOR THE AUTOMATIC CONTROLLED MANUFACTURE AND
OUTPUT OF PLASTIC BAGS
Filed Feb. 21, 1966     5 Sheets-Sheet 4
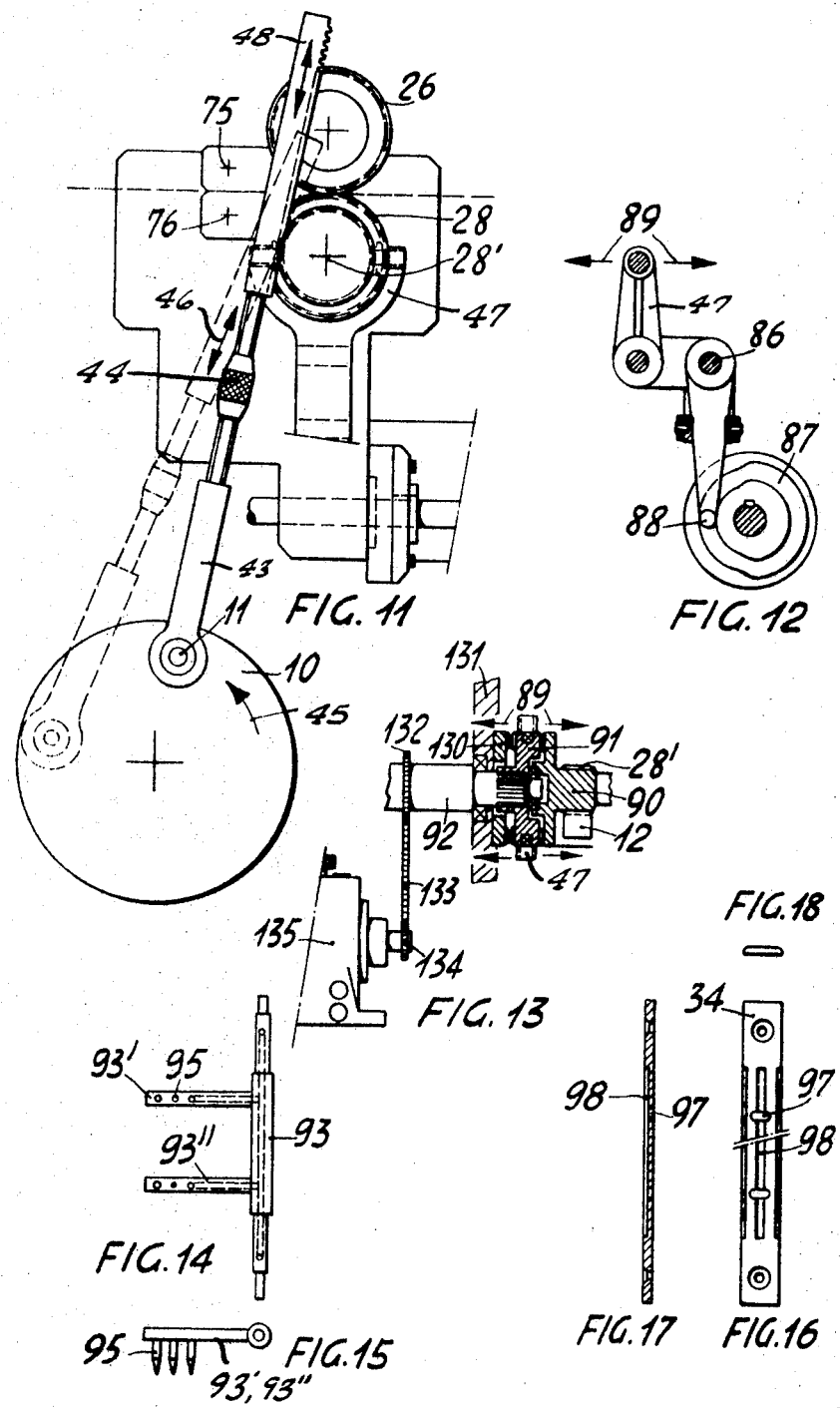
INVENTOR
Guido D. Bertoglio
BY Sparrow and Sparrow
ATTORNEYS

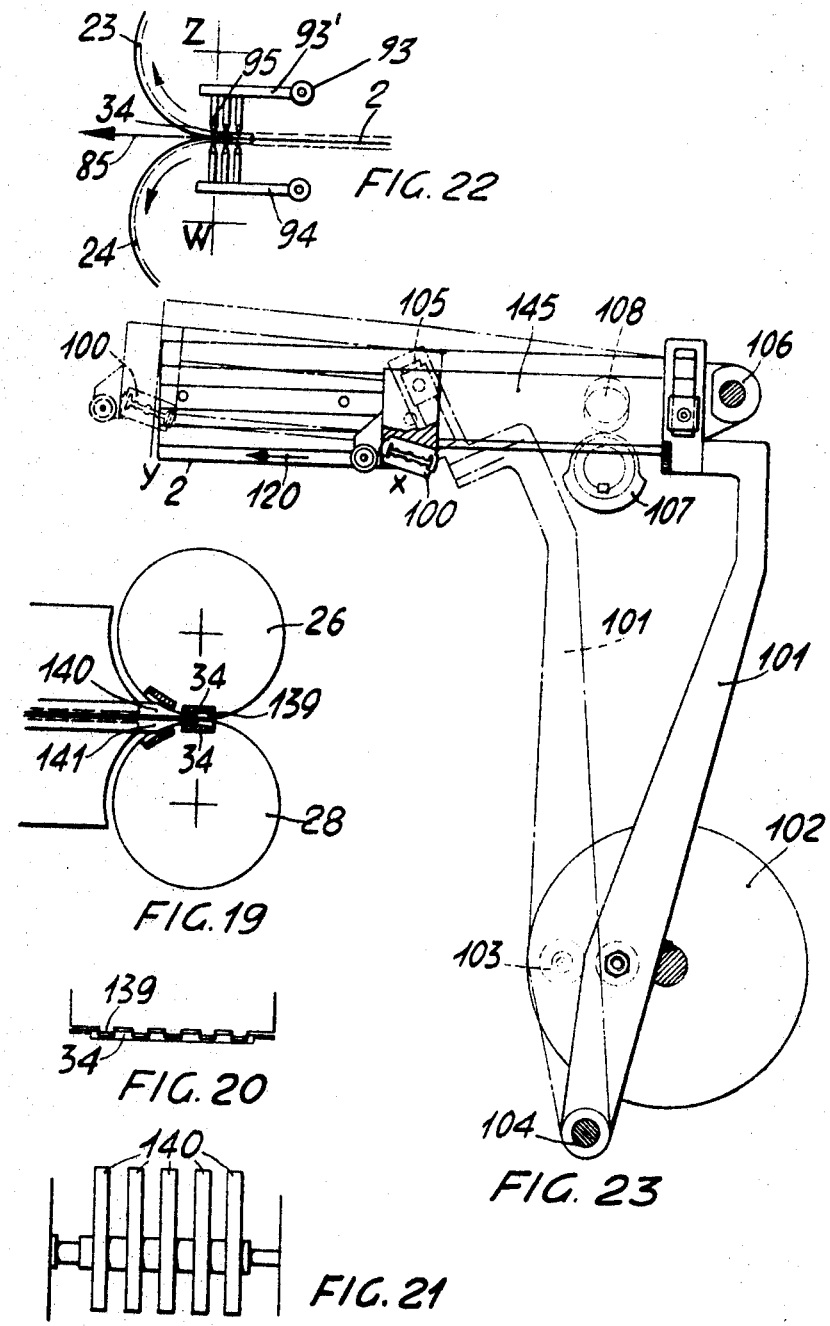

United States Patent Office 3,527,633
Patented Sept. 8, 1970

3,527,633
MACHINE FOR THE AUTOMATIC CONTROLLED MANUFACTURE AND OUTPUT OF PLASTIC BAGS
Guido D. Bertoglio, Viganello, Switzerland, assignor to Centra Anstalt, Vaduz, Liechtenstein, a corporation of Liechtenstein
Filed Feb. 21, 1966, Ser. No. 528,953
Claims priority, application Switzerland, Feb. 22, 1965, 2,421/65; Nov. 20, 1965, 16,063/65
Int. Cl. B32b 31/18
U.S. Cl. 156—353                                   8 Claims

ABSTRACT OF THE DISCLOSURE

The machine for producing bags made of a heat-sealable material has mechanisms for feeding a flattened tubular web from a roll in intermittent increments to a cross-cutting device after which operation the severed portion is guided into a system of conveyors. Straps are arranged on the conveyors for holding the cut portions. A pair of stationary thermo-welding jaws is located in the path of the conveyors and a second pair of stationary cooling jaws is arranged in the path of conveyors at the proper distance from the welding jaws. After having passed the cooling station the finished bags are delivered to a stop from where they may be picked up for another operation.

---

The present invention relates to a machine for the automatic controlled manufacture and output of plastic bags starting from a tubular endless band, characterized by:

a first group of members arranged to pick up the synchronous motion from the apparatus of the next following operation on the bags, and to transform said motion into synchronized but intermittent motion.

a second group of members with a synchronized intermittent motion of adjustable stroke arranged to pull at each cycle a flattened tubular web section, the length of this stroke corresponding to the bag to be manufactured.

a third group of cutting members having a synchronized intermittent motion and adapted to perform a cross cut of the tubular web at the end of said second group by simultaneously, if so desired, printing of letters or numbers on said plastic web.

a fourth group of members, with the same intermittent synchronized motion as before, for thermowelding the bottom of the bag, for transporting the bag, while preventing the deformation of the thermowelded, still hot portion, and for cooling of the said portion before the bag is delivered.

a fifth group of conveyor means for feeding the finished bag to a final position in front of the apparatus of the next following operation of the bag, said position being defined by a stop element which is to be released when, for any possible reason, the bag is not removed. Thus the next following bag will expel the bag which has not been used.

According to an improved embodiment, the operative unit forming a part of the first group of members comprises a disc rotating in synchronism with the apparatus of the next following operation on the bags, said disc having a pin or pivot attached thereto and a rack on the pivot driving a gear, the reciprocating movement of which is transformed into a unidirectional motion by a mechanism which for one direction of rotation of said gear is drivingly engaged while for the other direction of rotation said gear will be disengaged and idling, this intermittent unidirectional movement is imposed upon the conveying belts of the bag for moving the same forward.

According to the invention pneumatic or mechanic means at the output station of the bags are further provided on the conveying belts, said means being adapted to detach the bag from said conveying belts, thereby preventing same from being dragged along by the belts.

A blade for cutting the tubular plastic web without having the edges thereof sticking to each other is arranged to slide along the cutting line of the tubular web, and means are provided for lifting the blade above the cutting line during its return stroke.

The accompanying drawings show some preferred nonlimitative embodiments of the machine according to the present invention.

In the drawings:

FIG. 3 is a larger scale view of the first and fifth group of members.

FIG. 4 is a larger scale view of the second group of members.

FIG. 5 is a larger scale view of the details of the third group of members.

FIG. 6 is a view of the details of the fourth group of members.

FIGS. 7, 8 are a lateral and a frontal view of the thermowelding and cooling members for the bags.

FIGS. 9 and 10 are views of the thermowelding jaws.

FIG. 11 is a second embodiment of the machine and more precisely the unit comprising eccentric disc and the rack for intermittently moving the conveyor belts for the bag.

FIG. 12 is a view of the mechanism transforming the intermittent motion of the rack into a unidirectional motion.

FIG. 13 is a view of a detail of the same mechanism shown in FIG. 12.

FIG. 14 is a plan view of one of the two pneumatic members ejecting compressed air on the two opposite faces of the bag, respectively, so as to detach it from the conveying belts, thereby preventing same from being dragged along by the belts.

FIG. 15 is a lateral view of the pneumatic member shown in FIG. 14.

FIGS. 16, 17, 18, respectively, are a plan, a lateral and a frontal view of a plate forming a part of said conveying belts, said plate having grooves and holes formed therein to permit the passage and the distribution of the compressed air emitted by the means shown in FIGS. 14 and 15 for effecting the pneumatic detachment of the bag from the belt.

FIGS. 19, 20 and 21 are views of some members suited to detach the bags from the conveying belts by a mechanical (non-pneumatic) device.

FIG. 22 is a partial view of the conveying belt at the output of the bag after the cooling of the thermowelded edges has taken place, the method of the application of the pneumatic devices of FIGS. 14 and 15 being here clearly demonstrated.

FIG. 23 is a view of the device for actuating the cutting blade for the tubular web for causing the blade to slide along the cutting line.

Figure 1:
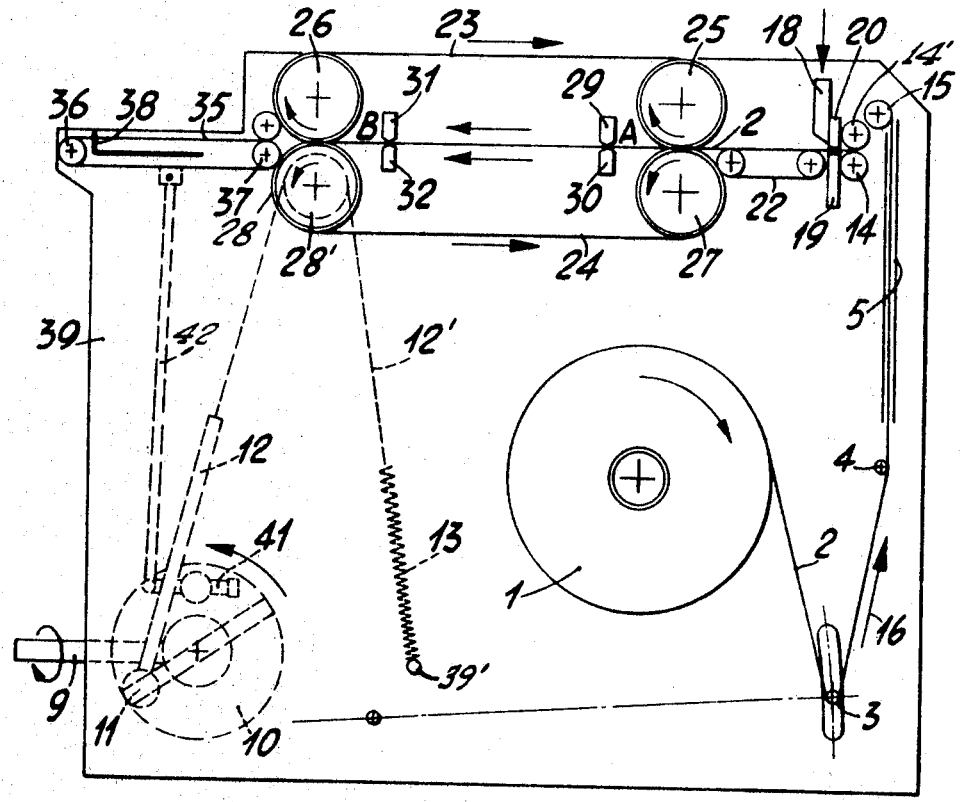
FIG. 1 is a diagrammatic frontal view of an embodiment of the machine showing the fundamental parts thereof.
Figure 2:
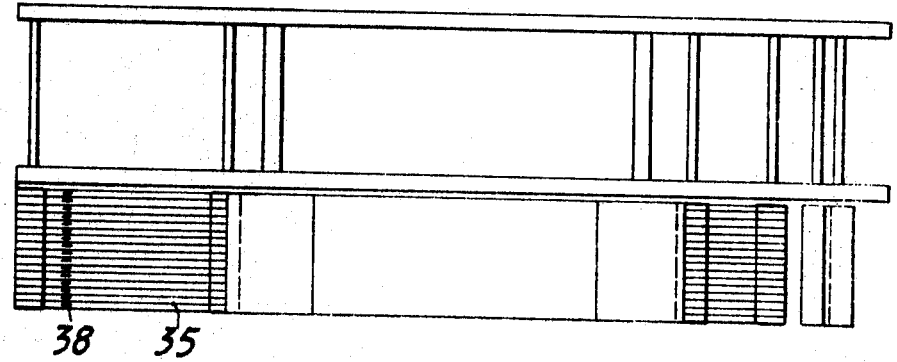
FIG. 2 is a plan view of the machine of FIG. 1.

With reference to FIG. 1, the machine of the invention comprises the roll 1 having a flattened tubular web 2 unwinding therefrom for forming the bags. Web 2 is guided over the pulleys 3 and 4 and advances to the metallic guide means 5 which keeps it perfectly flat.

The intermittent synchronized motion is applied to the various members by the first group of members comprising the shaft 9 (FIGS. 1 and 3) which takes the synchronized motion from the apparatus for the next following operation on the bags, and transforms it by means of the eccentric disc 10 into an intermittent motion for the operation of the above mentioned members. The diametral groove 10' in the disc 10 has the pivot 11 sliding in groove 10'. The linking rod 12 and the chain 12' are connected to pivot 11 for micrometric adjustment, and the spring 13 being attached at 39' to the frame 39 of the machine.

The second group of members (FIGS. 1 and 4) comprises the roller 15 and the two rollers 14 and 14 rotating in opposite directions serving to pull at each cycle and in the direction of the arrow 16 a section of tubular web 2 corresponding to the length of the bag. The stroke may be adjusted by means of a speed variator 17 (FIG. 4) which has adjusting means 80.

Successively web 2 is cut by means of a third intermittently and synchronizedly moving group of members 18–19 (FIGS. 1, 5). At this point it is also possible to print on the bags letters or numbers by means of punches 20 (FIG. 5). The blade 18, pivoted in 83, is actuated by the cam 81 which gets the motion from roller 14 over the roller 82 and is spring loaded by the spring 84.

The short conveying belt 22 is provided beyond the blades 18–19 and is provided for facilitating of the introduction of the cut bag into the fourth group of members which constitutes the most important part of the machine according to the present invention.

Said fourth group of members (FIG. 6) comprises two endless conveyor belts or two pairs of chains 23—23, 24—24 rotating in opposite direction and operating together in their common central straight section A–B. Said belts or chains are kept straight by the rollers 25–26, and 27–28 respectively, which rotate intermittently in synchronism and which are actuated by the first group of members 10–12. In their straight central section A–B, where the bag passes through, there are provided the thermowelding jaws 29–30 as well as the cooling jaws 31–32. The first named jaws perform the thermowelding of the bag end, while the second jaws cool the thermowelded portion which is continuously kept pressed between two straps 33 of non-adhesive material (for instance a cloth of synthetic resin such as polytetrafluoroethylene or the like plastic material).

Each strap is supported and kept straight by a plate 34 (FIGS. 7, 8) provided with a longitudinal slot 34' having the thermowelding and cooling jaws passing therethrough. The linear length of each chain or belt is a whole multiple number of the distance between one plate 34 and the successive plate 34" (see FIG. 6) so that at each intermittent advancement of the chains, one plate exactly takes the position of the preceding one.

Should belts be used instead of the chains 23 and 24, these belts will be made of polytetrafluoroethylene or the like plastics for having the triple function of conveying the bags preventing the thermowelding jaws 29–30 from adhering to the thermowelded portion of the bag and carrying the thermowelded and still hot portion of the bag so that it does not get deformed while passing from the thermowelding jaws 29–30 to the cooling jaws 31–32.

From the end of the fourth group of members the bag passes to the fifth group of conveying means 35–36–37 (FIG. 3) provided with the comb-like stop 38. This stop 38 stops the finished bag in an exact position to be taken up by an arm provided with suction cup means not shown in the drawing which transports it to the apparatus performing the next operation on the bags. Comb 38 is fixed to the frame 39 of the machine while the conveyor belt 35 consists of a plurality of small narrow-width belts or straps transmitted over two coaxial rollers shafts 36, 37 the roller 37 being intermittently driven by the members 10–12. At each cycle corresponding to the arrival of a bag said conveyor belt is caused to swing by means of a mechanism 42–41 about the pivot 85 to the dotted position 35' in FIG. 3. If, because of an erroneous move, the bag is not sucked by the above mentioned suction cups, it will be discharged forward (as indicated with 2') by the next following bag 2". When the conveyor belts 35' return to their horizontal position, the bag 2" which is about to arrive abuts against the comb stop 38 which resets the normal operation.

A speed variator 40 (FIG. 3) permits to vary by means of the control 68 the speed of the belt 35 to accelerate or decelerate the movement of the bag with respect to the arrival at the stop so that the bag will always meet the comb 38 at the end of its path even when its length (adjusted by the variator 17) is reduced.

The upward inclination of the level 35' (FIG. 3) improves adhering of the bag to the cup means at the instant when these pick it up for removing of the bag.

A discharge for the static electricity accumulated in the bag 2" is indicated with 67.

FIGS. 9–10 illustrate the details of the thermowelding jaws 29–30. A cam 68 receives the movement from the mechanism 10–12 and provides for the lifting and the lowering of the jaws against the force of the spring 70. Two thermo-electric couples 71–72 are provided for controlling the temperature.

The heating resistances are located in holes 73–74 (see FIG. 10). The cooling jaws 31–332 (FIGS. 1 and 6) are similar to the welding jaws 29–30 with the only difference that a cooling liquid flows through 73, 74.

With reference to FIG. 11, which shows an alternate mechanism for moving intermittently roller 28 and therewith chains 23, 24, the disc 10 is made to move synchronously with respect to the movement of the apparatus for the next following operation on the bags. The rod end 43 carrying the rack 48 is pivoted to said disc.

The turn buckle 44 is provided for adjusting of the position in which rack 48 is located with respect to the gear means 28' engaging rack 48.

During its rotary motion in the direction of the arrow 45 the disc imposes on the rack 48 a reciprocating motion indicated by the arrow 46 which in turn determines a reciprocating movement of gear 28' engaging said rack (FIG. 11). Application of said reciprocating movement to the conveyor belts 23–24 (FIGS. 1, 3, 22), which carry the thermowelded bag 2 in the direction of the arrow 85, would cause said belts to move in opposite directions.

Thus, it is necessary to transform said reciprocating movement into a unidirectional intermittent movement. To this extent the device shown in FIGS. 12, 13 comprises a bell crank lever 47 (see also FIG. 11) having an upper fork portion, pivoted in 86 and driven by the cam 87 (synchronized with the motion of the disc 10) over a roller 88. By virtue of the motion imparted by the cam 87 fork lever 47 oscillates in the two directions indicated by the arrows 89 (FIG. 12) thereby alternatively operating the engagement of the coupling 90 (FIG. 13).

When coupling 90 is engaged, gear 28' is coupled to a coupling sleeve 91, rotationally attached, to the shaft 92 controlling the motion of the conveyor belts 23–24 (FIGS. 1, 3, 21). When disengaged, coupling sleeve 91 engages the coupling 130 fixed to the frame part 131 of the machine and provides for stopping of the conveyor belts in an exact predetermined position.

The movement of the conveyor belt results therefore in an intermittent unidirectional movement for advancing of the tubular plastic web or the like by an increment corresponding to the length of a bag.

The shaft 92 (FIG. 13) has the gear 132 fixed thereto and connected over the chain 133 to the gear 134 connected in turn to the speed variator 135 which controls the speed of the conveyor belts.

By keeping the angular speed 45 constant and by varying, by means of the variator 135, the speed of the conveyor belts, it is possible to vary the length of the unidirectional intermittent stroke of said conveyor belts, e.g., the length of a bag.

A second variator (not shown in the drawing) provides for a corresponding variation of the speed of the means conveying the bag from the end of the belts to the machine for the next operation of the bag.

A further improvement according to the invention is constituted by the pneumatic members 93–94 (FIGS. 14, 15, 23) adapted to emit compressed air on the opposite faces of the bag (moving in the direction of the arrow 85) at the outlet of same from the conveyor belts 23 and 24. This compressed air jet provides for a perfect release of the bag from the belts.

Each pneumatic device comprises a tubular portion 93 (FIGS. 14, 15) ending in two branches 93'–93'' carrying nozzles 95 which emit said compressed air jet supplied by a compressor (not shown in the drawing).

The compressed air coming from the nozzles 95 passes through the holes 97 (FIG. 17) made in the plates 34 (FIG. 16) constituting the links of the chains forming the conveyor belts and is distributed in the grooves 98 (FIGS. 16, 17) for being well spread on the surface of the bag for completely releasing it from the belts.

A purely mechanical modification for releasing the bag from the conveyor belts is illustrated in the FIGS. 19–20–21.

The small plates 34 constituting the links of the conveyor belts (FIG. 19) are provided with free spaces 139 (FIGS. 19–20) having two series of stationery upper plates 140 and lower plates 141 (FIG. 19) penetrating therein in the forward moving direction of the bag, said stationary plates reaching up to the middle plane Z–W (FIG. 22) passing through the axes of the two front drums 26–28 of the above mentioned conveyor belts. Bag 2 is forced to enter between the two series of plates 140–141 and to leave the conveyor belts.

A last modification of considerable importance is constituted by the cutting device shown in FIG. 23 and comprising a blade 100 cutting the tubular web to obtain a bag, not in the conventional way by means of a guillotine system, but by sliding in the direction of arrow 120, along the cutting line XY of the bag, perpendicularly to the forward direction of the tubular band (FIG. 23). To this extent blade 100 is fixed to the plate 145 sliding in the arm 105 pivoted in 106. The plate 145 is operated by the lever 101 driven by the cam 102 with the operation of the roller 103.

The lever 101 is in turn pivoted in 104.

Arm 105 pivoted in 106 is operated by a second cam 107 cooperating with the roller 108 for lifting of the blade from the cutting plan during the return phase to its initial position.

When plate 145 moves from its right position (reference being made to FIG. 23) to the dotted left position, blade 100 moves along a horizontal operative path (XY) since the plate itself slides along horizontal slides and effects the cutting of the bag 2.

When the blade has reached its final position Y and has completely cut the tubular web cam 107 rotates, lifting arm 105, plate 145 and blade 100 (see the dotted line) and allowing for the return of the blade itself to its initial position X without contacting the surface on which the tubular web slides. Once the blade has arrived in X cam 107 causes the lowering of the blade back to the operative position X.

The cutting of the bag edges along the cutting line has the advantage that said edges do not stick to each other this being usually a very serious inconvenience inherent in the conventional guillotine cutting system.

Sticking edges would make it difficult to open the bags for the filling. With the improvement according to the invention the bags are readily and immediately opened without any difficulty.

The illustrated devices for reaching the above specified objects may be obviously substituted by conventional or equivalent means without departing from the spirit of the present invention.

What is claimed is:

1. A machine for manufacturing of plastic bags starting from a flattened tubular web, said machine comprising first members receiving in synchronism the motion from the machine for the next following operation on said bags and transforming said motion into a synchronized but intermittent motion, second members operating a synchronized intermittently working adjustable stroke, said second members pulling and forwarding a section of said web, the length of said section corresponding to the length of said bag to be manufactured, third members operating at said synchronized intermittent motion, said third members adapted for cross-cutting said flattened tubular web at the end of said second members and simultaneously having means for printing of insignia on said web, fourth members operating at said intermittent synchronized motion, said fourth members comprising thermowelding means for welding the ends of said bags, transporting means for said bags while preventing the deformation of the thermowelded hot portion of said bags and cooling means for said thermowelded, still hot portion prior to delivering of said bags, fifth members conveying said thermowelded and cooled bags to a stop position before said machine for the next following operation on said bags, said stop position having an operable stop element for permitting a bag to be discarded when said bag is not picked up by said machine for said next following operation.

2. A machine according to claim 1, said fourth members comprising two endless conveyor means moving in opposite directions and cooperating with one another along a common central straight section; said means moving intermittently in synchronism with said first members, and said thermowelding means comprising stationary welding jaws mounted to face either side of said bags.

3. A machine according to claim 1, and said cooling means comprising stationary cooling jaws mounted to face either side of said bags.

4. A machine according to claim 2, said conveyor means consisting of belts made of a non-sticking polymerisate resin for preventing them from adhering or welding to the welding material of said welding jaws.

5. A machine according to claim 4, said synthetic resin consisting of polytetrafluoroethylene.

6. A machine according to claim 2, said conveyor means comprise chains, conveyor plates attached to said chains at predetermined intervals corresponding to the length of one bag, said plates of one chain pressing against the plates of the other chain, straps attached to said plates, said bags being clamped between said straps and said straps having registered openings permitting said welding jaws to pass through.

7. A machine according to claim 6, and foils of non-sticking material covering said straps.

8. A machine according to claim 1, and pneumatic members at said stop position for emitting compressed air jet facilitating releasing of said bags from said conveying members.

References Cited

UNITED STATES PATENTS

| 2,800,162 | 7/1957 | Rohoin | 100—93 |
| 2,364,009 | 11/1944 | Tessendorf et al. | 156—498 X |
| 2,652,879 | 9/1953 | Keller et al. | 93—8 X |
| 2,720,246 | 10/1955 | Piazze | 93—8 X |
| 2,867,156 | 1/1959 | Burg | 93—8 |
| 2,882,956 | 4/1959 | Weist | 156—353 X |
| 3,142,608 | 7/1964 | Techtmann et al. | 156—583 X |
| 3,146,147 | 8/1964 | Naser | 156—583 X |
| 3,185,609 | 5/1965 | Merithew et al. | 156—530 |
| 3,233,527 | 2/1966 | Membrino | 93—8 |

JOHN T. GOOLKASIAN, Primary Examiner

J. C. GIL, Assistant Examiner

U.S. Cl. X.R.

156—366, 498, 510; 93—8